(12) United States Patent
Lee et al.

(10) Patent No.: US 9,746,705 B2
(45) Date of Patent: Aug. 29, 2017

(54) LIQUID CRYSTAL DISPLAY DEVICE

(71) Applicant: LG DISPLAY CO., LTD., Seoul (KR)

(72) Inventors: Hoseok Lee, Daegu (KR); HyunKi Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 96 days.

(21) Appl. No.: 14/952,568

(22) Filed: Nov. 25, 2015

(65) Prior Publication Data

US 2016/0161813 A1 Jun. 9, 2016

(30) Foreign Application Priority Data

Dec. 3, 2014 (KR) ........................ 10-2014-0172542

(51) Int. Cl.
*G02F 1/1333* (2006.01)
*G02F 1/13* (2006.01)
*G02F 1/1335* (2006.01)
*G02F 1/1345* (2006.01)

(52) U.S. Cl.
CPC ...... *G02F 1/133308* (2013.01); *G02F 1/1309* (2013.01); *G02F 1/1336* (2013.01); *G02F 1/13338* (2013.01); *G02F 1/13452* (2013.01); *G02F 2001/133314* (2013.01); *G02F 2001/133331* (2013.01); *G02F 2202/22* (2013.01); *G02F 2202/28* (2013.01)

(58) Field of Classification Search
CPC .................................................. G02F 1/133308
See application file for complete search history.

(56) References Cited

U.S. PATENT DOCUMENTS

2009/0310057 A1* 12/2009 Kang ................ G02F 1/133615
349/58
2012/0268686 A1* 10/2012 Lee ................... G02F 1/133308
349/59

* cited by examiner

*Primary Examiner* — Wen-Ying P Chen
(74) *Attorney, Agent, or Firm* — Birch, Stewart, Kolasch & Birch, LLP

(57) ABSTRACT

Discussed is a liquid crystal display device which facilitates to repair a backlight unit and corresponding internal parts without separation of a cover glass and a liquid crystal display panel, wherein the liquid crystal display device includes a liquid crystal display panel, a backlight unit disposed at a lower side of the liquid crystal display panel, and a conductive tape electrically connected with the liquid crystal display panel and the backlight unit, wherein the conductive tape includes a first conductive adhesive member, a non-adhesive pad attached to one surface of the first conductive adhesive member, and a second conductive adhesive member attached to the other surface of the first conductive adhesive member, and wherein the first conductive adhesive member is attached to the liquid crystal display panel, and the second conductive adhesive member is attached to the backlight unit.

20 Claims, 6 Drawing Sheets

LIQUID CRYSTAL DISPLAY DEVICE

CROSS REFERENCE TO RELATED APPLICATIONS

This application claims the benefit of the Korean Patent Application No. 10-2014-0172542 filed on Dec. 3, 2014, which is hereby incorporated by reference as if fully set forth herein.

BACKGROUND OF THE INVENTION

Field of the Disclosure

Embodiments of the present invention relate to a liquid crystal display device, and more particularly, to a liquid crystal display device using a conductive tape which facilitates to repair a backlight unit and internal parts.

Discussion of the Related Art

A liquid crystal display device displays an image by applying a voltage so as to change an alignment of liquid crystal molecules. Optical properties such as birefringence, optical activity, dichromatic and light-scattering properties are changed into visual properties in a liquid crystal cell which passes light upon the alignment of the liquid crystal molecules. That is, the liquid crystal display device displays information through the use of light modulation by the liquid crystal cell. The liquid crystal display device may include a backlight unit provided below a liquid crystal display panel. An image is displayed by the use of light emitted from the backlight unit.

Typical driving modes, that is, the most-generally used driving modes of the liquid crystal display device are a Twisted Nematic (TN) mode and an In-Plane Switching (IPS) mode. In the TN mode, a liquid crystal director (vector component) is aligned while being twisted by 90°, and a voltage is applied thereto, thereby controlling the liquid crystal director. In the IPS mode, two electrodes are provided on one substrate, whereby a liquid crystal director is twisted on a plane being in parallel to an alignment film.

In case of the IPS mode, pixel electrodes and common electrodes are formed in a pixel region of a lower substrate, whereby an in-plane electric field (i.e., horizontal electric field) is produced between the pixel and common electrodes, and a liquid crystal layer is aligned by the in-plane electric field.

FIG. 1 is a cross sectional view illustrating a related art liquid crystal display device. FIG. 2 illustrates a problem occurring when a backlight unit is separated from the related art liquid crystal display device shown in FIG. 1.

Referring to FIG. 1, the related art liquid crystal display device may include a cover glass 10, a liquid crystal display panel 20, a resin layer 30, a backlight unit 40, and a conductive tape 50.

The cover glass 10 protects the liquid crystal display panel 20. The cover glass 10 is attached to a front surface of the liquid crystal display panel 20, wherein the resin layer 30 is interposed between the cover glass 10 and the liquid crystal display panel 20.

The liquid crystal display panel 20 may include first and second substrates 21 and 22 bonded to each other with a liquid crystal layer interposed therebetween, a lower polarizing film 23 attached to a rear surface of the first substrate 21, an antistatic layer (electrostatic prevention layer) 24 provided on an upper surface of the second substrate 22, and an upper polarizing film 25 attached to the antistatic layer 24.

The resin layer 30 is coated onto a rear surface of the cover glass 10, to thereby bond the cover glass 10 and the liquid crystal display panel 20 to each other. In this case, the resin layer 30 is attached to an upper surface of the conductive tape 50 as well as the upper polarizing film 25 of the liquid crystal display panel 20.

The backlight unit 40 is disposed at a rear side of the liquid crystal display panel 20 so that a uniform flat light is emitted from a light source toward the liquid crystal display panel 20. According to a location of the light source with respect to a display surface, the backlight unit 40 may be classified into an edge type and a direct type.

The conductive tape 50 is attached to an upper edge of the antistatic layer 24 formed on the second substrate 22, and is also attached to a rear surface of the backlight unit 40 along lateral surfaces of the liquid crystal display panel 20 and the backlight unit 40.

In order to prevent static electricity produced in the second substrate 22, the conductive tape 50 electrically connects the antistatic layer 24 formed on the second substrate 22 and the rear surface of the backlight unit 40, thereby grounding any static electricity. To this end, the conductive tape 50 may be formed in a structure of sequentially stacking a conductive adhesive layer, an aluminum (Al) conductive layer, and a polyethylene (PET) resin layer.

Hereinafter, a problem of the related art liquid crystal display device will be described with reference to FIG. 2.

For disassembling and repairing the backlight unit 40 and corresponding internal parts, it is necessary to strip off or remove the conductive tape 50 from the backlight unit 50. However, when the conductive tape 50 is first stripped off, the conductive tape 50 may be wrinkled. Thus, it is impossible to reuse the conductive tape 50, and also to replace the conductive tape 50. For replacement of the conductive tape 50 attached to the resin layer 30, the cover glass 10 and the liquid crystal display panel 20 bonded to each other by the resin layer 30 should be separated from each other. During this process, cracks and defects to the liquid crystal display panel 20 may be caused. In this case, if it is difficult to repair the liquid crystal display panel 20, a production yield rate may be lowered, and the liquid crystal display device may be wasted. That is, when trying to repair the backlight unit 40 and/or any internal parts, a complicated disassembling process of the corresponding parts including difficulties in separating the cover glass 10 from the liquid crystal display panel 20 bonded thereto via the resin layer 30 can cause cracks and defects, which lead to problems in repairing the liquid crystal display device.

The above background description for the related art liquid crystal display device is based upon knowledge or information previously known or newly obtained as a result of research by the present inventors leading to the concepts and embodiments of the present invention. That is, such related art description is not prior art that was well-known to the general public before the conception and/or application date related to the technical matter disclosed hereafter.

SUMMARY OF THE INVENTION

Accordingly, embodiments of the present invention are directed to a liquid crystal display device that substantially obviates one or more problems due to limitations and disadvantages of the related art.

An aspect of embodiments of the present invention is directed to provide a liquid crystal display device which facilitates to repair a backlight unit and corresponding internal parts without separation of a cover glass and a liquid crystal display panel.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a liquid crystal display device that may include a liquid crystal display panel, a backlight unit disposed at a lower side of the liquid crystal display panel, and a conductive tape electrically connected with the liquid crystal display panel and the backlight unit, wherein the conductive tape includes a first conductive adhesive member, a non-adhesive pad attached to one surface of the first conductive adhesive member, and a second conductive adhesive member attached to the other surface of the first conductive adhesive member, and wherein the first conductive adhesive member is attached to the liquid crystal display panel, and the second conductive adhesive member is attached to the backlight unit.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Figure 1:
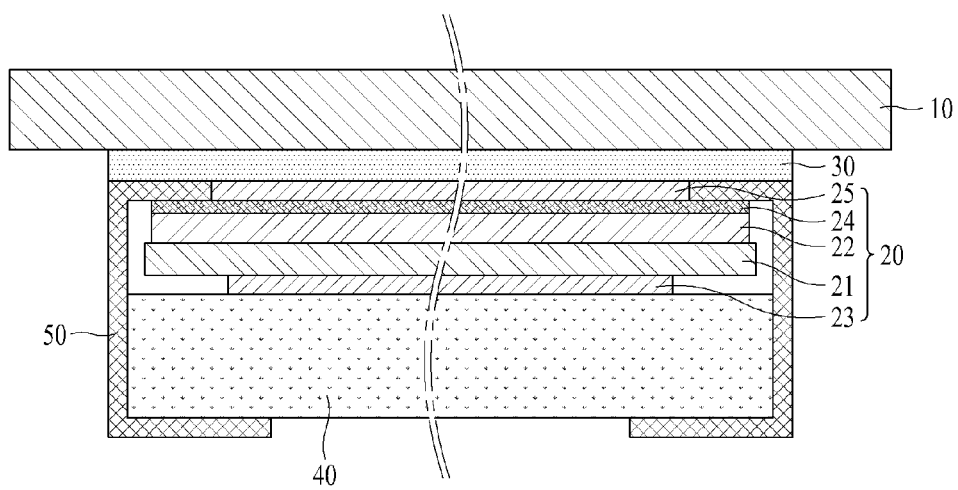
FIG. 1 is a cross sectional view illustrating a related art liquid crystal display device.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Figure 3:
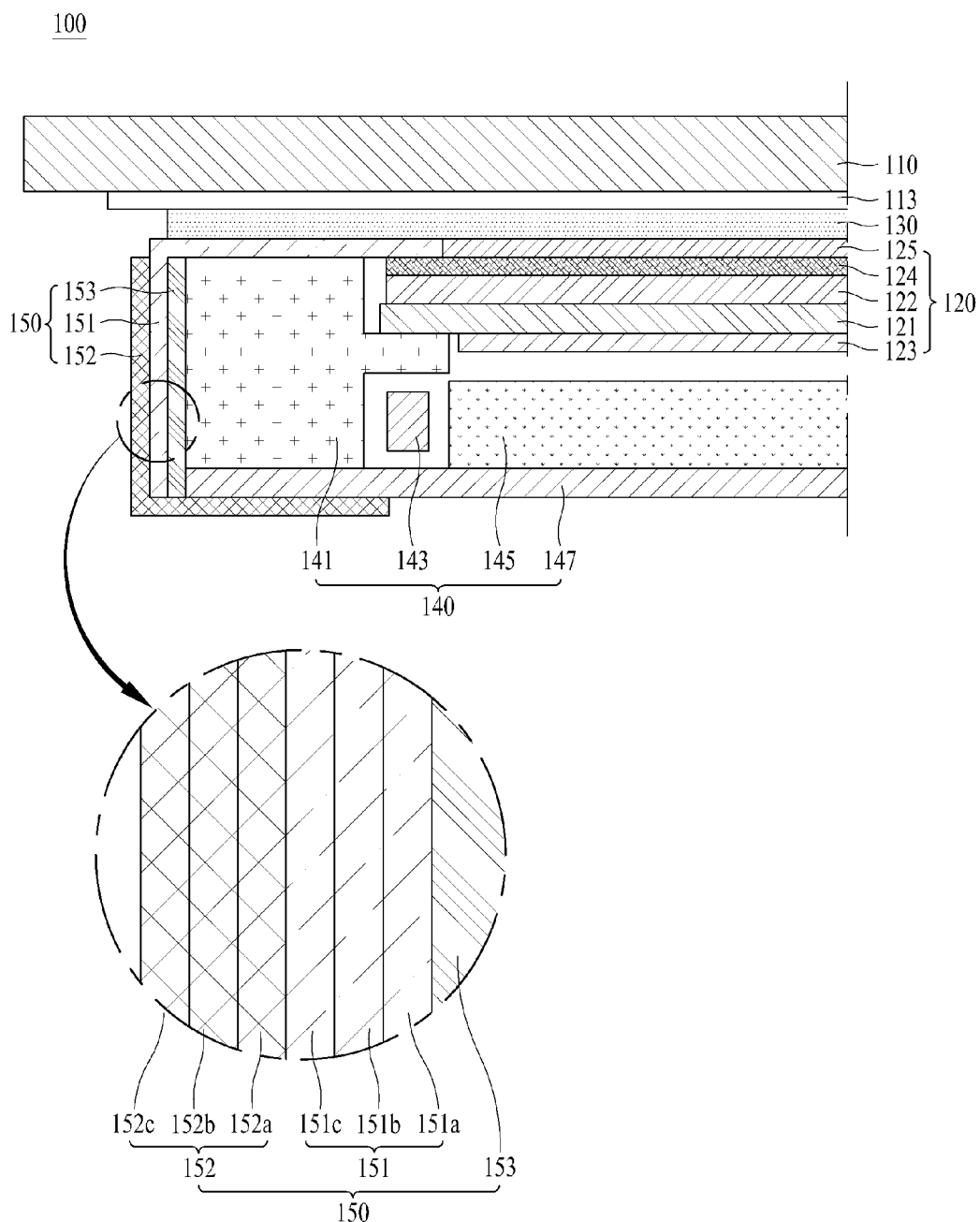
FIG. 3 is a cross sectional view illustrating a liquid crystal display device according to one embodiment of the present invention.

FIG. 3 is a cross sectional view illustrating a liquid crystal display device according to one embodiment of the present invention.

Referring to FIG. 3, a liquid crystal display device 100 according to one embodiment of the present invention may include a cover glass 110, a liquid crystal display panel 120, a resin layer 130, a backlight unit 140, and a conductive tape 150. All the components of the liquid crystal display device according to all embodiments of the present invention are operatively coupled and configured.

The cover glass 110 protects the liquid crystal display panel 120. The cover glass 110 is attached to a front surface of the liquid crystal display panel 120, wherein the resin layer 130 is interposed between the cover glass 110 and the liquid crystal display panel 120. Also, a touch sensor layer 113 may be provided on a rear surface of the cover glass 110. In this case, the touch sensor layer 113 is disposed between the cover glass 110 and the resin layer 130.

The liquid crystal display panel 120 (or a liquid crystal display panel assembly) is provided to display an image by controlling a transmittance of incident light. The liquid crystal display panel 120 may include first and second substrates 121 and 122 bonded to each other with a liquid crystal layer interposed therebetween, a lower polarizing film 123 attached to a rear surface of the first substrate 121, an antistatic layer (electrostatic prevention layer) 124 provided on an upper surface of the second substrate 122, and an upper polarizing film 125 attached to the antistatic layer 124.

The first substrate 121 may include a plurality of pixels provided at or near every crossing region between a plurality of gate lines and a plurality of data lines. Each pixel may include a thin film transistor connected with the gate and data lines, a pixel electrode connected with the thin film transistor, and a common electrode provided adjacent to the pixel electrode and supplied with a common voltage. In order to control a light transmittance of the liquid crystal layer, the first substrate 121 forms an electric field corresponding to a differential voltage between data and common voltages applied to each pixel. A pad including a signal applying pad connected with the plurality of data lines is provided at a lower (or upper) edge of the first substrate 121. Also, a gate driving circuit for supplying a gate signal to the plurality of gate lines is provided at a boundary, such as the left and/or right edge of the first substrate 121.

The second substrate 122 is bonded to the first substrate 121 with the liquid crystal layer interposed therebetween. On the second substrate 122, there is a color filter corresponding to each pixel. According to a driving method of the liquid crystal layer, a common electrode supplied with a common voltage may be additionally formed on the second substrate 122.

A detailed structure of the first and second substrates 121 and 122 may be varied according to structure types generally known to those in the art, and according to a driving mode of the liquid crystal layer, for example, TN (Twisted Nematic) mode, VA (Vertical Alignment) mode, IPS (In-Plane Switching) mode, FFS (Fringe Field Switching) mode, and etc.

Particularly, in case of the IPS mode, static electricity may be produced in the second substrate 122. In this respect, an antistatic layer 124 for grounding the static electricity is formed on the second substrate 122. The antistatic layer 124 may be formed of ITO (Indium Tin Oxide), and may be deposited on the second substrate 122.

The lower polarizing film 123 is attached to a rear surface of the first substrate 121, to thereby polarize the incident light. In this case, the lower polarizing film 123 may be attached to an entire area of the rear surface of the first substrate 121, or may be attached to certain portions of the rear surface of the first substrate 121 except the edges.

The upper polarizing film 125 may be attached to an upper surface of the antistatic layer 124, to thereby polarize the light which is transmitted through the second substrate 122 and then emitted outward.

The resin layer 130 is coated or otherwise provided onto a rear surface of the touch sensor layer 113, to thereby bond the touch sensor layer 113 of the cover glass 110 and the liquid crystal display panel 120 to each other. In this case, the resin layer 130 is attached to an upper surface of the conductive tape 150 as well as to the upper polarizing film 125 of the liquid crystal display panel 120.

Figure 2:
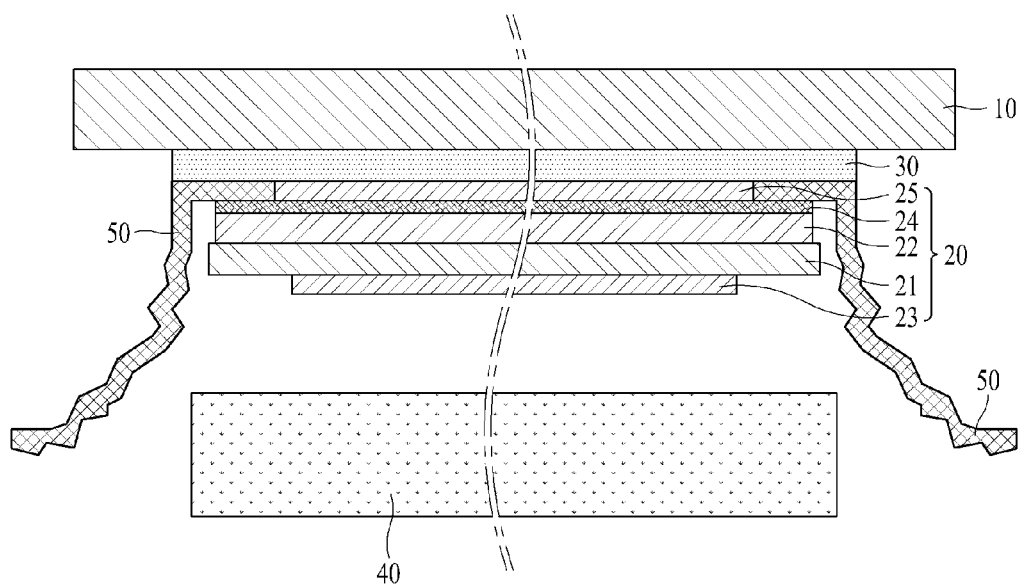
FIG. 2 illustrates a problem occurring when a backlight unit is separated from the related art liquid crystal display device shown in FIG. 1.

The backlight unit 140 is disposed at a rear side of the liquid crystal display panel 120 so that light emitted from a light source 143 is uniformly provided towards the liquid crystal display panel 120. The backlight unit 140 may be largely classified into a direct type and an edge type. In case of the direct type, the backlight unit 140 is disposed at an entire lower surface of the liquid crystal display panel 120, whereby light generated from the light source is directly emitted toward the liquid crystal display panel 120. Meanwhile, in case of the edge type, the light source 143 is disposed at a particular portion of a lower side of the liquid crystal display panel 120, whereby light emitted from the light source 143 is guided toward the liquid crystal display panel 120 by the use of a guide member, such as a light guide plate 145. FIG. 2 shows the backlight unit 140 of the edge type.

The backlight unit 140 of the edge type may include a guide panel 141, a light source 143, a light guide plate 145, and a lower plate 147.

The guide panel 141 is formed in a structure capable of supporting the liquid crystal display panel 120 and receiving the light source 143 therein. In FIG. 3, the guide panel 141 has an upper surface of a horizontal plane for supporting the cover glass 110 in parallel to the liquid crystal display panel 120, and also an extending portion with a certain width towards the liquid crystal display panel 120 so as to support the liquid crystal display panel 120, but the structure is not limited to this exemplary configuration. For example, an upper surface of the guide panel 141 may support only the liquid crystal display panel 120, and the liquid crystal display panel 120 itself may support the cover glass 110.

The light source 143 may be of various types. Recently, a light emitting diode (LED) which has great emission efficiency is widely used as the light source.

One lateral side of the light guide plate 145 faces the light source 143. Thus, the light guide plate 145 changes a light path so that the light emitted from the light source 143 is guided towards the liquid crystal display panel 120.

The lower plate 147 is disposed in a structure capable of supporting the guide panel 141 and the light guide plate 145, and the lower plate 147 is disposed at a lower side of the guide panel 141 and the light guide plate 145. The lower plate 147 is formed of a metal material such as aluminum (Al). Thus, the lower plate 147 for serving a grounding function is electrically connected with the antistatic layer 124 through the conductive tape 150.

The conductive tape 150 is provided for grounding the static electricity produced in the second substrate 122, wherein the conductive tape 150 electrically connects the antistatic layer 124, which is formed (or attached) on the second substrate 122, with (a metallic portion of) the backlight unit 140.

The conductive tape 150 may be defined as a pliable substrate. The pliable substrate may include a particular thickness and made of a particular material, configured to secure a backlight unit 140 onto the liquid crystal display panel 120 and to provide an electrical grounding path from the liquid crystal display panel 120 to a metallic portion of the backlight unit 140. The pliable substrate is configured to be wrapped around and along at least one edge of the backlight unit 140. At least one among the particular thickness and the particular material of the pliable substrate depends upon one or more characteristics among panel size, panel weight, backlight size, and backlight weight. Further, the pliable substrate is configured to provide the electrical grounding path from the liquid crystal display panel 120 that supports operations in In-Plane Switching (IPS) mode. Wherein the pliable substrate has notched portions configured to facilitate attachment or detachment of the backlight unit 140 with respect to the liquid crystal display panel 120.

The conductive tape 150 may include a first conductive adhesive member 151, a second conductive adhesive member 152, and a non-adhesive pad 153.

The first conductive adhesive member 151 may cover all edges of the liquid crystal display panel 120. In more detail, the first conductive adhesive member 151, which is attached to an upper surface of the antistatic layer 124, extends to a lateral surface of the guide panel 141. The first conductive adhesive member 151 may be defined as a first section. The first section is configured to be adhered along an edge of the liquid crystal display panel 120, in adhesive contact with a resin that attaches a cover glass onto the liquid crystal display panel 120, and to cover at least a side surface of the at least one edge of the backlight unit 140. The first section is configured to adhere to an anti-static layer at outer surface of the liquid crystal display panel 120 underneath a cover glass 110.

The non-adhesive pad 153 is attached to one lateral surface of the first conductive adhesive member 151. The non-adhesive pad 153 may be defined as a second section. The second section is configured to be selectively adhered to a rear surface of the backlight unit 140 and to be overlappingly attached to a portion of the first section. The second section is de-attachable from the first section for replacement upon re-attachment of the backlight unit 140 to the liquid crystal display panel 120.

The second conductive adhesive member 152 may be extended to some portions of a lateral surface of the liquid crystal display panel 120. In more detail, the second conductive adhesive member 152 is attached to the other lateral surface of the first conductive adhesive member 151, and is also attached to a lower surface of the lower plate 147. The second conductive adhesive member 152 may be defined as a third section. The third section is configured to have one surface in adhesive contact with the first section and an opposing surface in non-adhesive contact with the side surface of the at least one edge of the backlight unit 140, in non-adhesive contact with the rear surface of the backlight unit 140, or in non-adhesive contact with both the side surface and the rear surface. Wherein the pliable substrate being selectively de-attachable due to the non-adhesive contact provided by the third section to facilitate removal of the backlight unit 140 from the liquid crystal display panel 120. Wherein the pliable substrate is configured for attachment along a bottom edge of the liquid crystal display panel 120 is different from that configured for attachment along the other three edges of the liquid crystal display panel 120, in that a printed circuit board is attached to the first section without the second section attached thereto.

In order for the conductive tape 150 to serve as a grounding path, the first conductive adhesive member 151 and the second conductive adhesive member 152 can have the following structures. The first conductive adhesive member 151 is formed as a structure of sequentially stacking a first conductive adhesive layer 151a, a second conductive layer 151b, and a first conductive light-shielding layer 151c. The second conductive adhesive member 152 is formed in a structure of sequentially stacking a second conductive adhesive layer 152a, a second conductive layer 152b, and a second light-shielding layer 152c. As the first conductive adhesive layer 151a is attached to the antistatic layer 124, the static electricity may flow to the first conductive layer 151b and the first conductive light-shielding layer 151c to be effectively grounded. Also, the static electricity may flow to the lower plate 147 through the second conductive adhesive layer 152a and the second conductive layer 152b attached to the first conductive light-shielding layer 151c.

The first conductive layer 151b and the second conductive layer 152b may be formed of a metal material with good conductivity, for example, copper (Cu). The first conductive light-shielding layer 151c, which is a black-ink layer including a conductive material, may be coated (or attached) onto the first conductive layer 151b. Owing to the first conductive light-shielding layer 151c, the static electricity may flow to the second conductive adhesive member 152 attached to the first conductive adhesive member 151. Also, the first conductive light-shielding layer 151c or the second light-shielding layer 152c prevents an internal light leakage between the backlight unit 140 and the liquid crystal display panel 120.

The non-adhesive pad 153 is not provided with upper and lower adhesive layers. The non-adhesive pad 153 may be formed of polyethylene (PET) resin. Accordingly, the non-adhesive pad 153 contacts with a lateral surface of the first conductive adhesive layer 151a of the first conductive adhesive member 151. However, the non-adhesive pad 153 is brought into contact with the lateral surface of the guide panel 141 without being adhered thereto. In other words, the adhesive characteristic is removed from a predetermined portion of the first conductive adhesive member 151 to which the non-adhesive pad 153 is in contact with. That is, when trying to remove the first conductive adhesive member 151 from the backlight unit 140, easy separation is possible. Thus, the first conductive adhesive member 151 may be re-used without replacement when the repaired backlight unit 140 is re-assembled with the liquid crystal display panel 120.

Figure 4A:
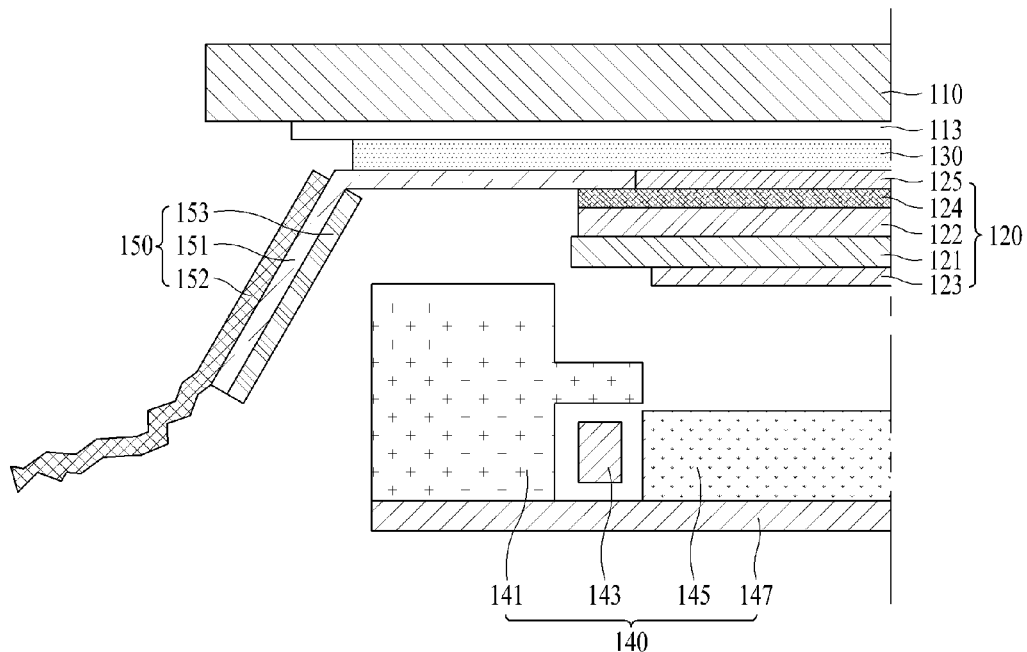
FIGS. 4A to 4C illustrate a repairing process of a backlight unit in the liquid crystal display device shown in FIG. 3.
Figure 4B:
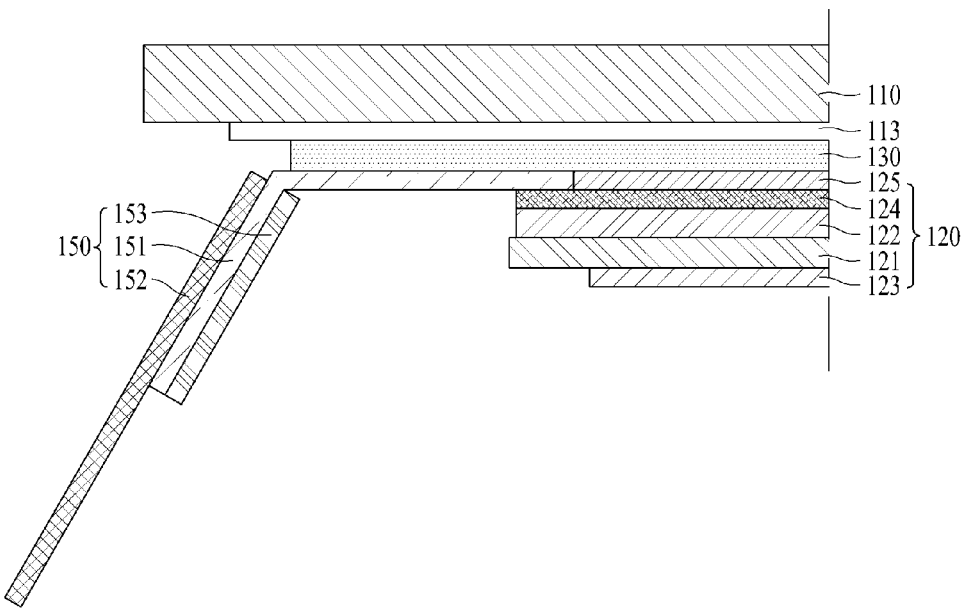
Figure 4C:
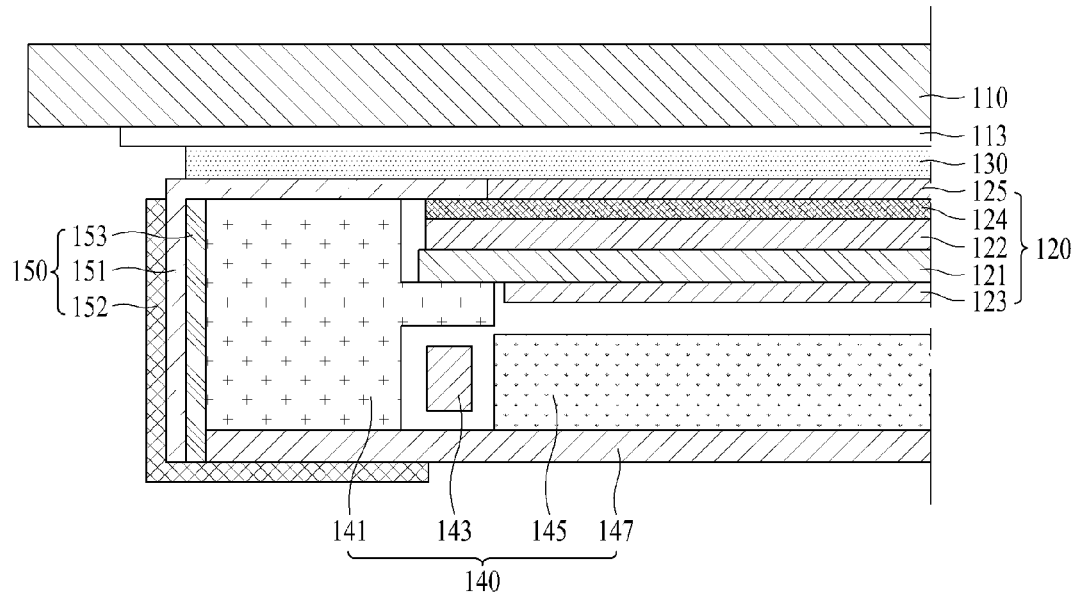

FIGS. 4A to 4C illustrate a repairing process of the backlight unit 140 in the liquid crystal display device shown in FIG. 3.

First, as shown in FIG. 4A, the conductive tape 150 should be removed from the backlight unit 140 so as to separate the backlight unit 140 from the liquid crystal display panel 120. In this case, when a first part of the second conductive adhesive member 152 is stripped off or otherwise detached from the lower plate 147 of the backlight unit 140, the second conductive adhesive member 152 is wrinkled by the stripping handling, that is, it is impossible to re-use the second conductive adhesive member 152. Since the second conductive adhesive member 152 is formed of the metal material, it is impossible to restore the second conductive adhesive member 152 to its original shape due to the properties of the metal material.

Referring to FIG. 4B, the wrinkled second conductive adhesive member 152 is completely removed from the first conductive adhesive member 151, and then the new second conductive adhesive member 152 is replaced.

Referring to FIG. 4C, the repaired backlight unit 140 is combined with and attached to the liquid crystal display panel 120 by the use of conductive tape 150 whose second conductive adhesive member 152 is replaced.

In clear contrast, for the repair of the backlight unit 140 in the liquid crystal display device according to embodiments of the present invention, only the corresponding part is separated and repaired, that is, the first conductive adhesive member 151 and the liquid crystal display panel 120 are not separated from the resin layer 130. Accordingly, it is possible to minimize possible formation of cracks and defects in the liquid crystal display panel 120.

Figure 5:
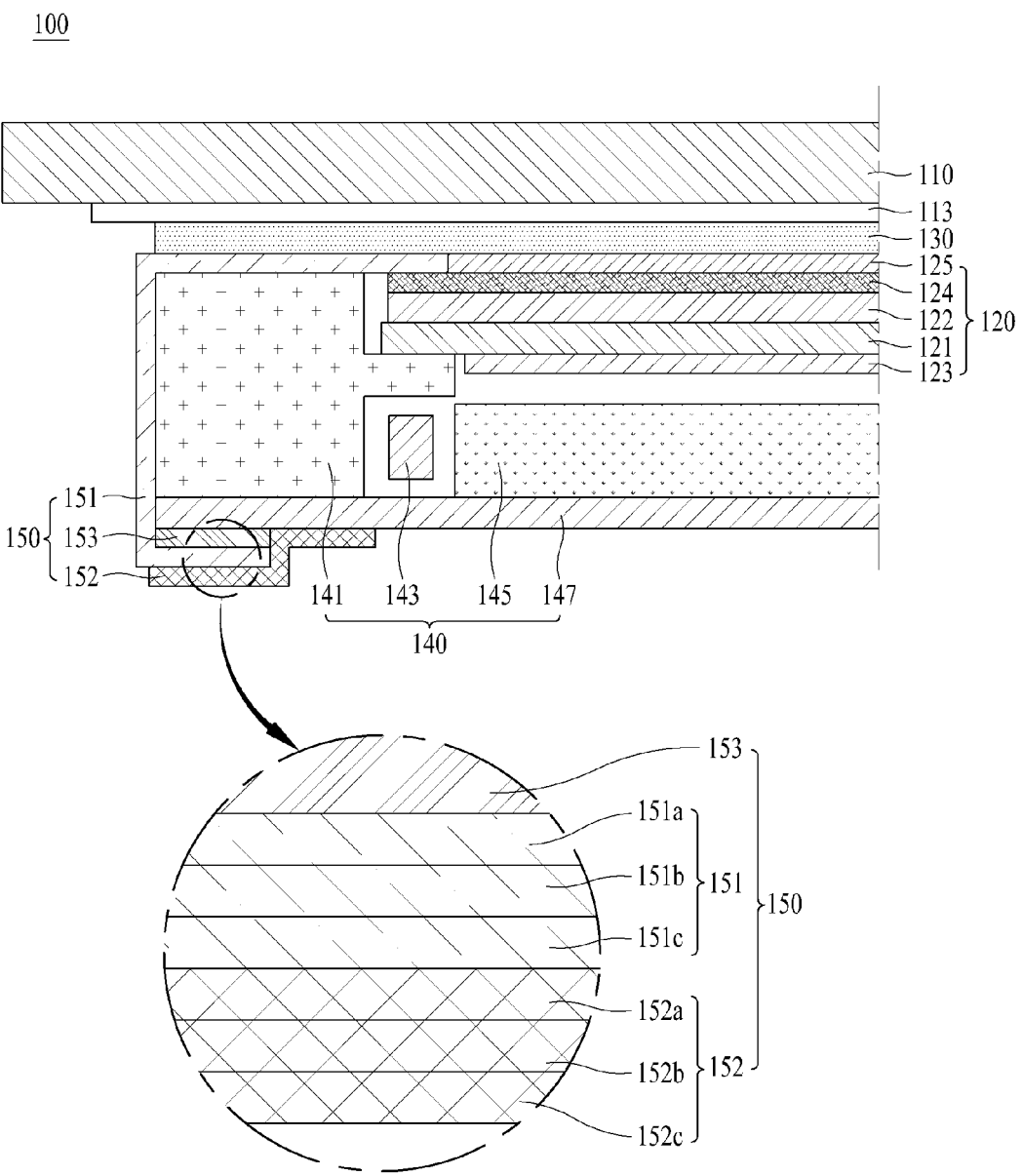
FIG. 5 is a cross sectional view illustrating a liquid crystal display device according to another embodiment of the present invention.

FIG. 5 is a cross sectional view illustrating a liquid crystal display device according to another embodiment of the present invention.

As shown in FIG. 5, in the same manner as the above liquid crystal display device shown in FIG. 3, the liquid crystal display device 100 according to another embodiment of the present invention may include a cover glass 110, a liquid crystal display panel 120, a resin layer 130, a backlight unit 140, and a conductive tape 150.

Referring to FIG. 5, a contact portion between a non-adhesive pad 153 of the conductive tape 150 and the backlight unit 140 is changed in its position so that an attachment area and length between the backlight unit 140 and each of a first conductive adhesive member 151 and a second conductive adhesive member 152 constituting the conductive tape 150 are changed relatively. Except for the above structure, the liquid crystal display device of FIG. 5 is the same as the liquid crystal display device of FIG. 3, whereby a detailed description for the same parts will be omitted.

The conductive tape 150 is provided for grounding static electricity produced in the second substrate 122, wherein the conductive tape 150 electrically connects an antistatic layer 124, which is formed (or attached) on the second substrate 122, with (a metallic portion of) the backlight unit 140. The conductive tape 150 may include a first conductive adhesive member 151, a second conductive adhesive member 152, and a non-adhesive pad 153.

The first conductive adhesive member 151, which is attached to an upper surface of the antistatic layer 124, extends to a predetermined portion of a lower surface of a lower plate 147 via a lateral surface of a guide panel 141. The non-adhesive pad 153 is provided in an overlapping area between the first conductive adhesive member 151 and the predetermined portion of the lower surface of the lower plate 147 so that it is possible to prevent one end of the first conductive adhesive member 151 from being attached to the lower surface of the lower plate 147. The non-adhesive pad 153 is in contact with one surface of the first conductive adhesive layer 151a of the first conductive adhesive member 151.

The second conductive adhesive member 152 is attached to one surface of the first conductive light-shielding layer 151c of the first conductive adhesive member 151, and also attached to a lower surface of the lower plate 147.

For providing the conductive tape 150 serves as a grounding path, structures of the first conductive adhesive member 151 and the second conductive adhesive member 152 are the same as structures shown in FIG. 3, whereby a detailed description for the same parts will be omitted.

The non-adhesive pad 153 is not provided with upper and lower adhesive layers. The non-adhesive pad 153 may be formed of polyethylene resin (PET). Accordingly, the non-adhesive pad 153 is attached to one surface of the first conductive adhesive layer 151a of the first conductive adhesive member 151. However, the non-adhesive pad 153 is in contact with the lower surface of the lower plate 147 without being adhered thereto. Thus, the adhesive characteristic is removed from a predetermined portion of the first conductive adhesive member 151 at which the non-adhesive pad 153 is in place. That is, when trying to remove the first conductive adhesive member 151 from the backlight unit 140, easy separation is possible. Thus, the first conductive adhesive member 151 may be re-used without replacement when the repaired backlight unit 140 is re-assembled with the liquid crystal display panel 120.

In the same manner as the above repairing process of the backlight unit 140 in the liquid crystal display device of FIGS. 4A to 4C, the conductive tape 150 is stripped off (or detached) from the backlight unit 140, the wrinkled second conductive adhesive member 152 is replaced, and the repaired backlight unit 140 is re-assembled with and attached to the liquid crystal display panel 120.

For the repair of the backlight unit 140 in the liquid crystal display device according to the present invention, only the corresponding part needs to be separated and repaired. That is, there is no need to separate the first conductive adhesive member 151 and the liquid crystal display panel 120 from the resin layer 130. Accordingly, it is possible to prevent or minimize possibilities of damage to the liquid crystal display panel 120.

Figure 6:
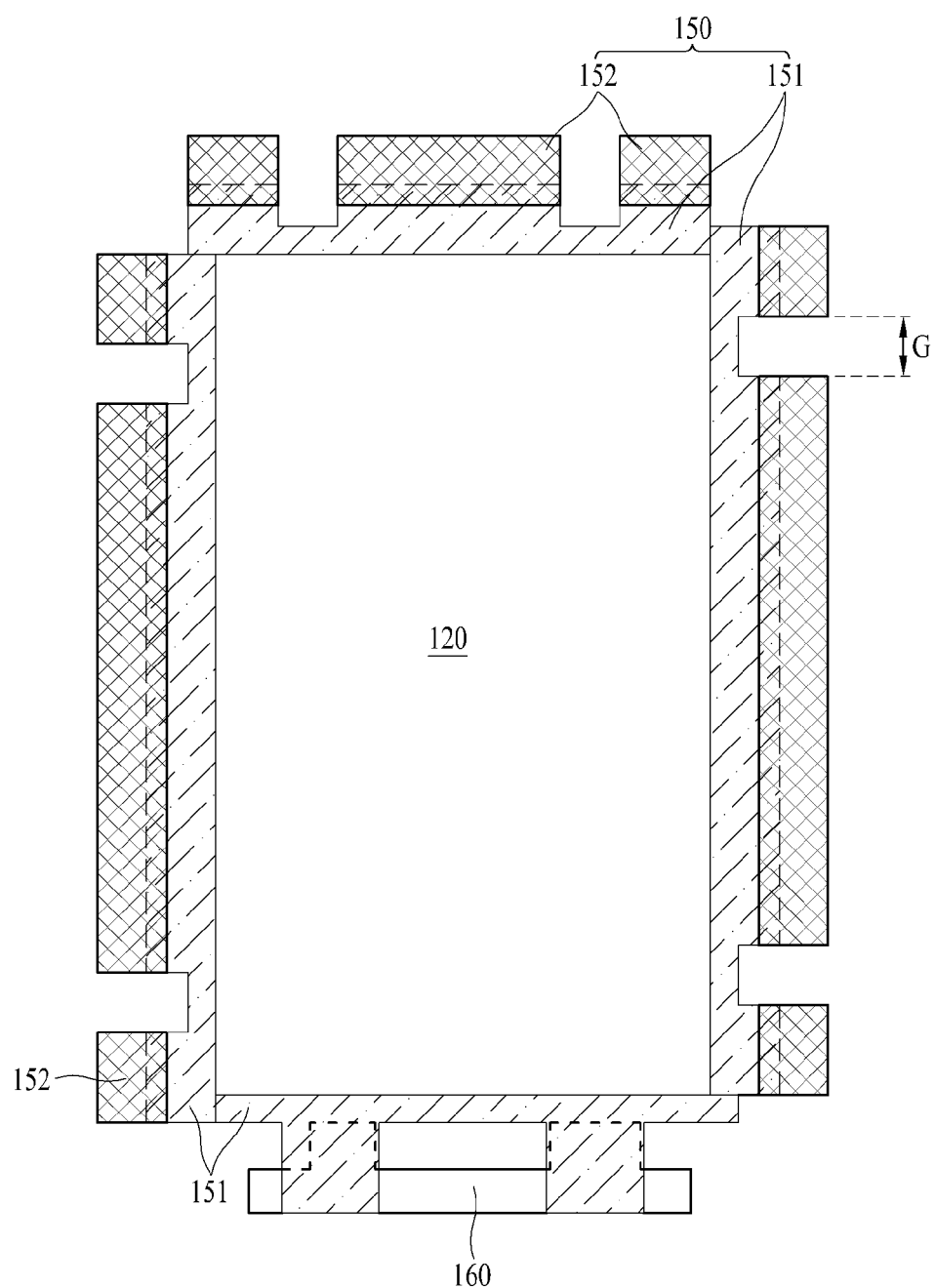
FIG. 6 is a plane view illustrating an example of a conductive tape attached to a liquid crystal display panel according to an embodiment of the present invention.

FIG. 6 is a plane view illustrating an example of the conductive tape 150 attached to the liquid crystal display panel 120, which shows an unfolded state of the liquid crystal display panel 120 with the conductive tape 150 attached thereto. As shown in FIG. 6, the conductive tape 150 may cover all four edges of the liquid crystal display panel 120 so as to prevent the internal light leakage. In more detail, each of four portions of conductive tape 150 covers each of four edges of the liquid crystal display panel 120. That is, a first conductive tape 150 is provided to cover the upper edge of the liquid crystal display panel 120, a second conductive tape 150 is provided to cover the lower edge of the liquid crystal display panel 120, a third conductive tape 150 is provided to cover the left edge of the liquid crystal display panel 120, and a fourth conductive tape 150 is provided to cover the right edge of the liquid crystal display panel 120.

In this case, the respective first conductive adhesive members 151 of the four conductive tapes 150 cover all the edges of the liquid crystal display panel 120. Particularly, a portion of an end of the first conductive adhesive member 151, which is positioned adjacent to each corner of the liquid crystal display panel 120, is partially removed at a predetermined width (G). Also, the second conductive adhesive member 152 of each of the remaining three conductive tapes 150 except the conductive tape 150 provided at the lower side of the liquid crystal display panel 120 is not formed in the area of the first conductive adhesive member 151 with the partially-removed end, but formed in the area of the first conductive adhesive member 151 from which the partial portion of the end is not removed. Accordingly, the second conductive adhesive member 152 does not cover all of the edges of the liquid crystal display panel 120, but only covers partial portions of the edges of the liquid crystal display panel 120.

Also, the second conductive adhesive member 152 extends from the area of the first conductive adhesive member 151 from which the partial portion of the end is not removed, whereby the second conductive adhesive member 152 may be attached to cover the lower plate of the backlight unit.

According to the above structure of the first conductive adhesive member 151 and the second conductive adhesive member 152, it is possible to effectively prevent the internal light leakage in the four edges of the liquid crystal display panel 120, and to facilitate the attachment of the conductive adhesive member at the four corners of the liquid crystal display panel 120.

In other words, if trying to bend and attach the first conductive adhesive member 151, which is provided in a rectangular shape whose end is not partially removed at the predetermined width (G), at the corner of the liquid crystal display panel 120, it is difficult to bend the first conductive adhesive member 151 and to attach the bent first conductive adhesive member 151 uniformly because the first conductive adhesive member 151 is formed in a lengthwise direction of a lateral side. However, if the portion of the end of the first conductive adhesive member 151 is partially removed at the predetermined width (G), the area of the first conductive adhesive member 151 from which the partial portion of the end is not removed is bent and attached at each corner of the liquid crystal display panel 120, sequentially, with ease.

Meanwhile, as shown in FIG. 6, only the first conductive adhesive member 151 is attached to the lower side of the liquid crystal display panel 120, that is, the second conductive adhesive member 152 is not attached thereto. This is because a printed circuit board 160 is connected with the lower side of the liquid crystal display panel 120. Namely, the printed circuit board 160 is attached to the first conductive adhesive member 151, and also attached to cover the lower plate 147 of the backlight unit 140. Instead of the first conductive adhesive member 151, the printed circuit board 160 can be attached to the backlight unit 140 by the use of double-sided tape. As such, if a repair of the backlight unit 140 (or other parts and components related thereto need replacement or repair) is needed, the separation and re-assembly of the printed circuit board 160 can be easily performed to thus allow the corresponding part to be repaired and/or replaced.

According to an example of the conductive tape 150 attached to the liquid crystal display panel 120, the conductive tape 150 is formed to cover the four edges of the liquid crystal display panel 120, and is attached from the upper surface of the liquid crystal display panel 120 to the lower plate 147 of the backlight unit 140, thereby preventing the internal light leakage and achieving proper grounding. In addition, the conductive tape 150 connects the liquid crystal display panel 120 and the backlight unit 140 with each other, to thereby secure the liquid crystal display panel 120 and the backlight unit 140 from being separated. In detail, the conductive tape 150 is formed to have a predetermined length in the lengthwise direction of the lateral side of the liquid crystal display panel 120, whereby the liquid crystal display panel 120 and the backlight unit 140 are stably connected with each other, thereby preventing the liquid crystal display panel 120 and the backlight unit 140 from being undesirably separated from each other.

According to the embodiments of the present invention, the repairing process of the backlight unit and the internal parts may be carried out without a separation of the cover glass and the liquid crystal display panel, thereby improving a production yield rate and reducing waste of materials.

Also, the separation and re-assembly of the conductive tape becomes easier by using the second conductive adhesive member and the non-adhesive pad of the conductive tape, thereby improving workability.

It will be apparent to those skilled in the art that various modifications and variations can be made in the present invention without departing from the technical scope thereof. Thus, it is intended that the present invention covers various modifications and variations provided they come within the scope of the appended claims and their equivalents.

What is claimed is:
1. A liquid crystal display device comprising:
a liquid crystal display panel;
a backlight unit at a lower side of the liquid crystal display panel; and
a conductive tape electrically connected with the liquid crystal display panel and the backlight unit,
wherein the conductive tape includes a first conductive adhesive member, a non-adhesive pad attached to one surface of the first conductive adhesive member, and a second conductive adhesive member attached to the other surface of the first conductive adhesive member, and
wherein the first conductive adhesive member is attached to the liquid crystal display panel, and the second conductive adhesive member is attached to the backlight unit.

2. The liquid crystal display device according to claim 1, wherein the liquid crystal display panel includes a first substrate, a second substrate, and an antistatic layer provided on the second substrate,
wherein the backlight unit includes a light source, a lower plate at a lower side of the light source, and a guide panel for supporting the liquid crystal display panel, and
wherein the first conductive adhesive member is attached to the antistatic layer, and the second conductive adhesive member is attached to a lower surface of the lower plate.

3. The liquid crystal display device according to claim 2, wherein the first conductive adhesive member extends from an upper surface of the antistatic layer to a lateral surface of the guide panel.

4. The liquid crystal display device according to claim 2, wherein the first conductive adhesive member extends from an upper surface of the antistatic layer to a lower surface of the lower plate via a lateral surface of the guide panel.

5. The liquid crystal display device according to claim 2, wherein the non-adhesive pad contacts with the guide panel without being adhered to the guide panel.

6. The liquid crystal display device according to claim 2, wherein the non-adhesive pad contacts with the lower plate without being adhered to the lower plate.

7. The liquid crystal display device according to claim 2, wherein the first conductive adhesive member includes:
a first conductive adhesive layer having one surface attached to the non-adhesive pad, and the other surface attached to the upper surface of the antistatic layer;
a first conductive layer on the first conductive adhesive layer; and
a first conductive light-shielding layer on the first conductive layer.

8. The liquid crystal display device according to claim 7, wherein the second conductive adhesive member includes:
a second conductive adhesive layer having one surface attached to one surface of the first conductive light-shielding layer, and the other surface attached to the lower surface of the lower plate;
a second conductive layer on the second conductive adhesive layer; and
a second light-shielding layer on the second conductive layer.

9. The liquid crystal display device according to claim 8, wherein the first conductive layer and the second conductive layer are formed of copper, and the first conductive light-shielding layer is formed of a black ink coating having a conductive material therein.

10. The liquid crystal display device according to claim 1, further comprising a cover glass attached to the upper surface of the liquid crystal display panel by using a resin layer, wherein the first conductive adhesive member is attached to the resin layer.

11. The liquid crystal display device according to claim 10, further comprising a touch sensor layer between the resin layer and the cover glass.

12. The liquid crystal display device according to claim 1, wherein the first conductive adhesive member covers all edges of the liquid crystal display panel, and the second conductive adhesive member extends to some portions of a lateral surface of the liquid crystal display panel.

13. A structure comprising:
a pliable substrate having a particular thickness and made of a particular material, and configured to secure a backlight unit onto a liquid crystal display (LCD) panel assembly and to provide an electrical grounding path from the LCD panel assembly to a metallic portion of the backlight unit,
the pliable substrate configured to be wrapped around and along at least one edge of the backlight unit, and
the pliable substrate having
a first section configured to be adhered along an edge of the LCD panel assembly, in adhesive contact with a resin that attaches a cover glass onto the LCD panel assembly, and to cover at least a side surface of the at least one edge of the backlight unit,
a second section configured to be selectively adhered to a rear surface of the backlight unit and to be overlappingly attached to a portion of the first section, and
a third section configured to have one surface in adhesive contact with the first section and an opposing surface in non-adhesive contact with the side surface of the at least one edge of the backlight unit, in non-adhesive contact with the rear surface of the backlight unit, or in non-adhesive contact with both the side surface and the rear surface.

14. The structure of claim 13, wherein the pliable substrate is selectively de-attachable due to the non-adhesive contact provided by the third section to facilitate removal of the backlight unit from the LCD panel assembly.

15. The structure of claim 14, wherein the second section is de-attachable from the first section for replacement upon a re-attachment of the backlight unit to the LCD panel assembly.

16. The structure of claim 15, wherein at least one among the particular thickness and the particular material of the pliable substrate depends upon one or more characteristics among panel size, panel weight, backlight size, and backlight weight.

17. The structure of claim 16, wherein the first section is configured to adhere to an anti-static layer at an outer surface of the LCD panel assembly underneath the cover glass.

18. The structure of claim 17, wherein the pliable substrate is configured to provide an electrical grounding path from the LCD panel assembly that supports operations in an In-Plane Switching (IPS) mode.

19. The structure of claim 18, wherein the pliable substrate has notched portions configured to facilitate an attachment or detachment of the backlight unit with respect to the LCD panel assembly.

20. The structure of claim 19, wherein the pliable substrate configured for attachment along a bottom edge of the LCD assembly is different from that configured for attachment along the other three edges of the LCD assembly, in that a printed circuit board is attached to the first section without the second section attached thereto.

* * * * *